(12) United States Patent
Wexel et al.

(10) Patent No.: US 7,226,680 B2
(45) Date of Patent: Jun. 5, 2007

(54) INTEGRATED AIR COOLER, FILTER, AND HUMIDIFICATION UNIT FOR A FUEL CELL STACK

(75) Inventors: Dirk Wexel, Mainz-Kastel (DE); Bernhard Wnendt, Rüsselsheim (DE)

(73) Assignee: General Motors Corporation, Detroit, MI (US)

( * ) Notice: Subject to any disclaimer, the term of this patent is extended or adjusted under 35 U.S.C. 154(b) by 541 days.

(21) Appl. No.: 10/360,685

(22) Filed: Feb. 7, 2003

(65) Prior Publication Data

US 2004/0157098 A1 Aug. 12, 2004

(51) Int. Cl.
*H01M 8/04* (2006.01)
(52) U.S. Cl. ........................................ 429/26
(58) Field of Classification Search ................ 429/22, 429/25, 26, 34
See application file for complete search history.

(56) References Cited

U.S. PATENT DOCUMENTS

| | | | |
|---|---|---|---|
| 5,680,987 A * | 10/1997 | Taylor | ........................ 239/75 |
| 5,952,119 A | 9/1999 | Wilson | |
| 5,965,288 A | 10/1999 | Okamoto | |
| 5,996,976 A | 12/1999 | Murphy et al. | |
| 6,024,848 A | 2/2000 | Dufner et al. | |
| 6,066,408 A | 5/2000 | Vitale et al. | |
| 6,103,409 A * | 8/2000 | DiPierno Bosco et al. | ... 429/13 |
| 6,106,964 A | 8/2000 | Voss et al. | |
| 6,284,399 B1 | 9/2001 | Oko et al. | |
| 6,350,535 B1 | 2/2002 | Kralick | |
| 6,376,111 B1 | 4/2002 | Mathias et al. | |
| 6,403,249 B1 | 6/2002 | Reid | |
| 6,416,895 B1 | 7/2002 | Voss et al. | |
| 6,432,177 B1 * | 8/2002 | Dallas et al. | ................. 96/132 |

FOREIGN PATENT DOCUMENTS

JP 11317238 A * 11/1999

* cited by examiner

*Primary Examiner*—Gregg Cantelmo
(74) *Attorney, Agent, or Firm*—Harness, Dickey & Pierce, P.L.C.

(57) ABSTRACT

System for thermally conditioning, humidifying and filtering reactant feed gases supplied to a stack of fuel cells using an evaporative element, a water spray mechanism and a heat exchanger. The evaporation element also functions as a filter. The evaporative element may take the form of a removable packing (filter media). Use of a controller to manage the rate of nebulized water addition to the feed gas stream is also described. Benefits in filter efficiency and extended filter service life along with volume, weight, and cost reduction in a fuel cell system are realized.

32 Claims, 5 Drawing Sheets

INTEGRATED AIR COOLER, FILTER, AND HUMIDIFICATION UNIT FOR A FUEL CELL STACK

FIELD OF THE INVENTION

The present invention relates to gas conditioning of a fuel cell power system, and, in particular, to an apparatus and method for conditioning the temperature, humidity and/or purity of reactant gases supplied to a stack of fuel cells.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells have flow fields with inlets to fluid manifolds; these collectively provide channels for the various reactant and cooling fluids reacted in the stack to flow into each cell. Gas diffusion assemblies then provide a final fluid distribution to further disperse reactant fluids from the flow field space to the reactive anode and cathode; these diffusion sections are frequently advantageously embedded as a part of the design of collector electrodes pressing against the reactive anode and cathode.

Effective operation of a PEM requires a balanced supply of water in the polymer of a PEM to maintain its proton conductivity while maintaining the flow field channels and gas diffusion assemblies in non-flooded operational states. In this regard, the hydrogen is supplied to the anode face of the MEA and reacts with the catalyst thereon to form hydrogen cations and free electrons. The oxidant, typically oxygen or oxygen-containing air, is supplied to the cathode face of the MEA and reacts with hydrogen cations that have crossed the proton exchange membrane to form water. Thus, the fuel cell generates both electricity and water through the electrochemical reaction, and the water is removed with the cathode effluent, dehydrating the PEM of the fuel cell unless the water is otherwise replaced. It is also to be noted that the inlet air flow rate to the cathode will generally evaporate water from the proton exchange membrane at an even higher rate than the rate of water generation (and commensurate dehydration of the PEM) via reaction at the cathode.

When hydrated, the polymeric PEM possesses "acidic" properties that provide a medium for conducting protons from the anode to the cathode of the fuel cell. However, if the PEM is not sufficiently hydrated, the "acidic" character diminishes, with commensurate reduction of the desired electrochemical reaction of the cell. Hydration of a fuel cell PEM also assists in temperature control within the fuel cell, insofar as the heat capacity of water provides a heat sink.

There is also a need to maintain the flow field channels and gas diffusion assemblies in a non-plugged state respective to any particulates which might be in the gaseous oxidant and fuel fluids which feed the cell; this concern is especially relevant to the oxidant in fuel cell power systems deployed on vehicles when the oxidant is air, since the condition of air varies from location to location, and the vehicle clearly has a purpose of providing transportation from location to location. As is generally appreciated, filters are traditionally used in vehicles to provide clean air to both fuel cells and, for that matter, to most internal combustion engines traditionally used to power vehicles.

There is also a need to provide thermal conditioning of feed gases to the fuel cell stack. In this regard, it is desirable to maintain the temperature of the feed gases within an operating range. However, the ambient conditions of the environment as well as the operating conditions of the fuel cell system may cause the feed gases to be outside of the desired temperature range.

In addition to issues in water balance, filtration and temperature conditioning of feed gases, another issue in fuel cell design for use in vehicles is directed to the efficient use of space. In this regard, space in a vehicle is precious and design approaches which represent an efficient use of space in the vehicle clearly benefit the utility of the vehicle; this leads toward integration of the humidifying system or gas conditioning system into each of the fuel cells, as provided.

Accordingly, there is a need for a fuel cell power system which includes full humidification of the feed gases (especially the oxidant), high capture filtration of particulates in the feed gases, and thermal conditioning of feed gases commensurate with full humidification, in such a way that a minimum of space is needed for the humidification, cooling and filtration operations.

SUMMARY OF THE INVENTION

One aspect of the present invention provides a fuel cell power system having a stacked series of fuel cells and including an integral evaporative element for passively promoting the evaporation of water into the feed gas stream from a two-phase feed gas stream of feed gas and nebulized water. The evaporative element provides a medium for mass transfer of the nebulized water to fully humidify the feed gas stream. In addition and especially when wetted with water, the evaporative element provides filtration of solid particulates from the feed gas stream. Furthermore, the evaporative element provides a temperature conditioning function for controlling the inlet temperature of the feed gas stream. In one preferred embodiment, the invention also provides a removable evaporative element in the form of a packing or filter media and for use of a controller to manage the rate of nebulized water added to the feed gas stream.

Another aspect of the present invention provides a fuel cell power system having a stacked series of fuel cells and including an integral heat exchange element for thermally conditioning the feed gas stream entering the individual fuel cells. The heat exchange element provides a heat transfer means for extracting heat from or adding heat to the feed gas stream. Such thermal conditions may be based upon the present operating state and the desired operating conditions of the fuel cell power system.

Yet another aspect of the present invention provides a fuel cell power system having a stacked series of fuel cells and including an integral water injection mechanism for introducing water into the feed gas stream prior to entry into the individual fuel cells. The water injection mechanism can be used to increase the relative humidity of the feed gas stream and is preferably used in conjuction with an evaporative element. The water injection mechanism can also be used to provide thermal conditioning of the feed gas stream depending on the temperature difference between the water and the feed gas stream.

While described herein with respect to a cathode feed stream, the invention also provides for use of an evaporative element, a heat exchange element and/or a water injection mechanism for thermally conditioning, humidifying and filtering the fuel gas feed to the fuel cell.

There are several benefits which are derived from the present invention. Because of the relatively extensive surface area of the evaporative element, the invention provides for high filter efficiency and extended filter service life; and per the integration of a heat exchanger, filter, and water injector into one unit supported by the fuel cell stack plates, the invention provides a basis for volume, weight, and cost reduction in a fuel cell system.

The invention is further appreciated from a consideration of the Figures and the Detailed Description Of The Preferred Embodiments.

DETAILED DESCRIPTION OF THE PREFERRED EMBODIMENTS

The invention is further understood with reference to a generic fuel cell power system. Therefore, before further describing the invention, a general overview of the fuel cell power system within which the improved fuel cells of the invention operate is provided. In the system, a hydrocarbon fuel is processed in a fuel processor, for example, by reformation and partial oxidation processes, to produce a reformate gas which has a relatively high hydrogen content on a volume or molar basis. Therefore, reference is made to hydrogen-containing as having relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

Figure 1:
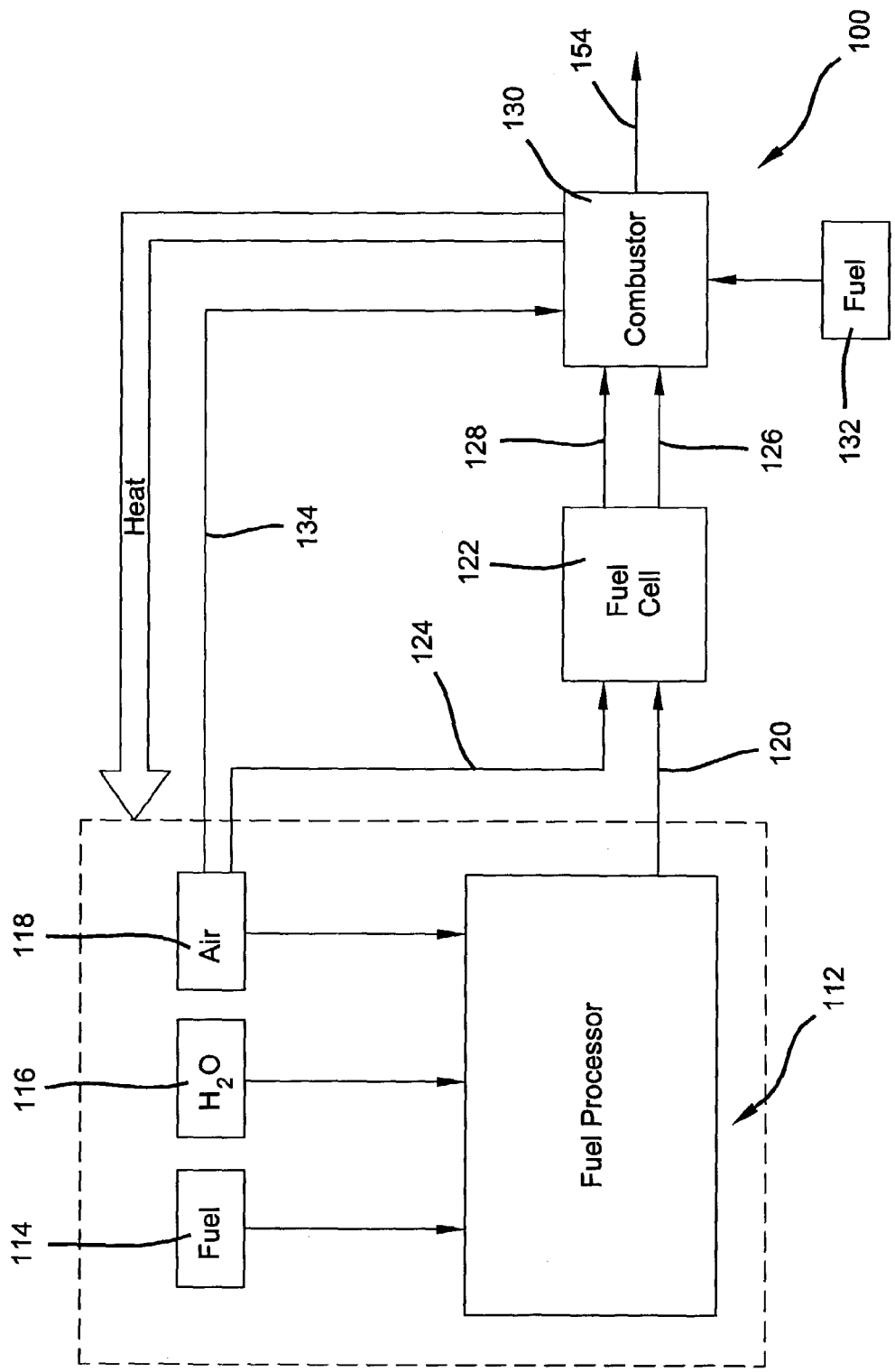
FIG. 1 shows a fuel cell power system overview.

As shown in FIG. 1, a fuel cell power system 100 includes a fuel processor 112 for catalytically reacting a reformable hydrocarbon fuel stream 114, and water in the form of steam from a water stream 116. In some fuel processors, air is also used in a combination partial oxidation/steam reforming reaction. In this case, fuel processor 112 also receives an air stream 118. The fuel processor 112 may contain one or more reactors wherein the reformable hydrocarbon fuel in stream 114 undergoes dissociation in the presence of steam in stream 116 and air in stream 118 (optionally oxygen storage tank 118) to produce the hydrogen-containing reformate exhausted from fuel processor 112 in reformate stream 120. Fuel processor 112 typically also includes one or more secondary reactors, such as water-gas shift (WGS) and/or preferential oxidizer (PrOx) reactors that are used to reduce the level of carbon monoxide in reformate feed gas stream 120 to acceptable levels, for example, below 20 ppm. $H_2$-containing reformate 120 is fed through the anode chamber of fuel cell stack system 122. At the same time, oxygen in the form of air in an oxidant feed gas stream 124 is fed into the cathode chamber of fuel cell stack system 122. The hydrogen from reformate stream 120 and the oxygen from oxidant stream 124 react in fuel cell stack system 122 to produce electricity.

Anode exhaust (or effluent) 126 from the anode side of fuel cell stack system 122 contains some unreacted hydrogen. Cathode exhaust (or effluent) 128 from the cathode side of fuel cell stack system 122 may contain some unreacted oxygen. These unreacted gases represent additional energy recovered in combustor 130, in the form of thermal energy, for various heat requirements within power system 100.

Specifically, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 154 to the environment, and the heat generated thereby is directed to fuel processor 112 as needed.

Figure 2:
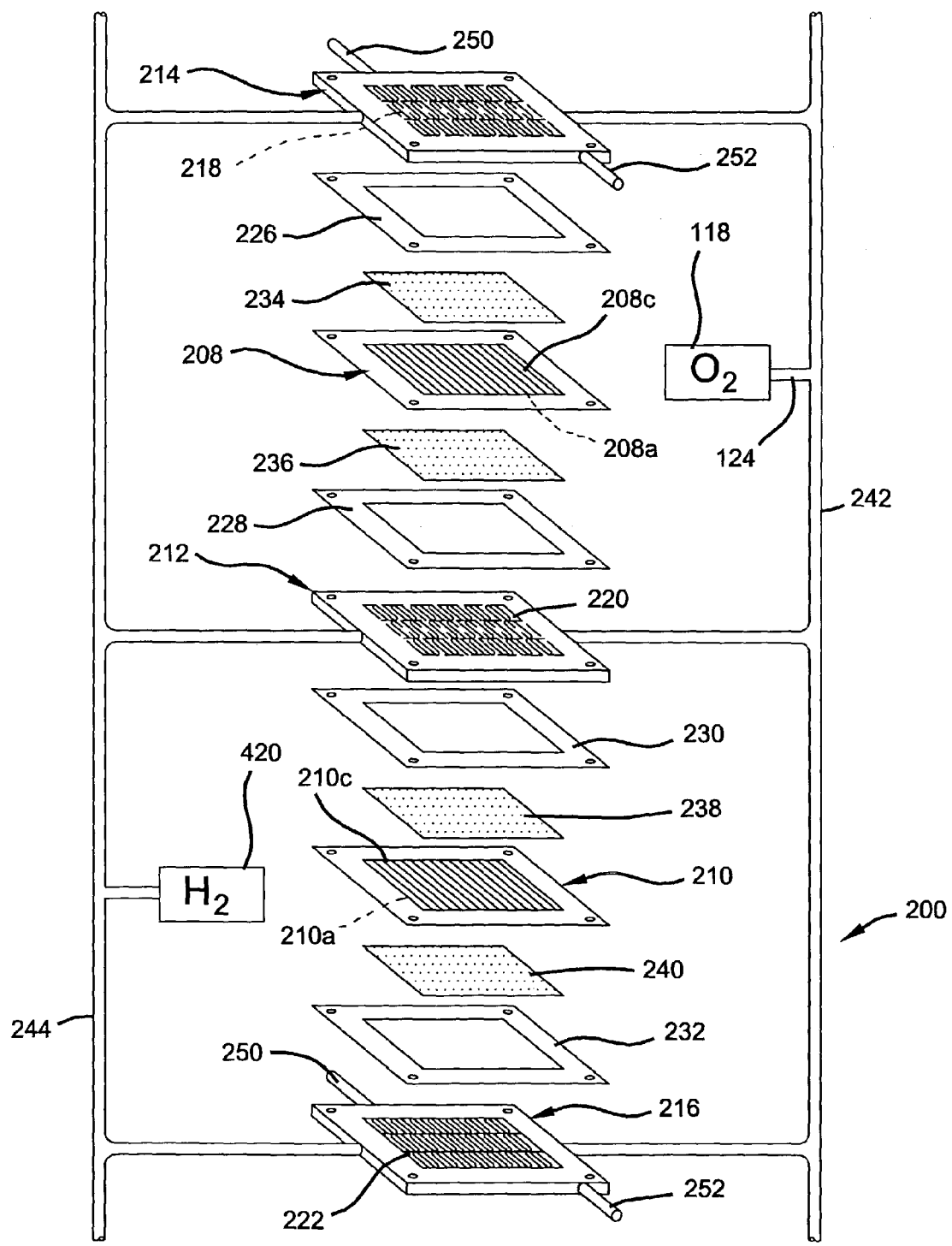
FIG. 2 shows schematic representation of a portion of a PEM fuel cell stack within the fuel cell stack assembly of the fuel cell power system of FIG. 1.

Turning now to FIG. 2, a two-cell PEM fuel cell stack 200 of fuel cell stack system 122 is schematically depicted as having a pair of membrane electrode assemblies (MEAs) 208 and 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive, liquid-cooled end plates 214 and 216. Plates 212, 214, 216 each include respective flow fields 218, 220, 222 established from a plurality of flow channels formed in the faces of the plates for distributing fuel and oxidant gases (i.e., $H_2$ & $O_2$) to the reactive faces of MEAs 208, 210. Nonconductive gaskets or seals 226, 228, 230, 232 provide sealing and electrical insulation between the several plates of fuel cell stack 200.

Porous, gas permeable, electrically conductive sheets 234, 236, 238, 240 press up against the electrode faces of MEAs 208, 210 and serve as primary current collectors for the respective electrodes. Primary current collectors 234, 236, 238, 240 also provide mechanical supports for MEAs 208, 210, especially at locations where the MEAs are otherwise unsupported in the flow field. Bipolar plate 214 presses up against primary current collector 234 on cathode face 208c of MEA 208, bipolar plate 216 presses up against primary current collector 240 on anode face 210a of MEA 210, and bipolar plate 212 presses up against primary current collector 236 on anode face 208a of MEA 208 and against primary current collector 238 on cathode face 210c of MEA 210.

An oxidant gas such as air/oxygen is supplied to the cathode side of fuel cell stack 200 from air source/storage tank 118 and line 124 via appropriate supply plumbing 242. In a preferred embodiment, oxygen tank 118 is eliminated, and air is supplied to the cathode side from the ambient via a pump or compressor. A fuel such as hydrogen is supplied to the anode side of fuel cell 200 from storage tank 420 via appropriate supply plumbing 244. In a preferred embodiment, hydrogen tank 420 is eliminated and the anode feed stream is supplied from a reformer (as described with reference to FIG. 1) via line 120 after catalytically dissociating hydrogen from hydrocarbon fuel 114.

Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to bipolar plates 214, 216, as needed.

It is to be noted that fuel cell stack 200 shows two fuel cells with plate 212 being shared between the two fuel cells. In practice, the number of individual cells in a fuel cell stack is dictated by the particular application and may include many individual fuel cells.

Figure 3:
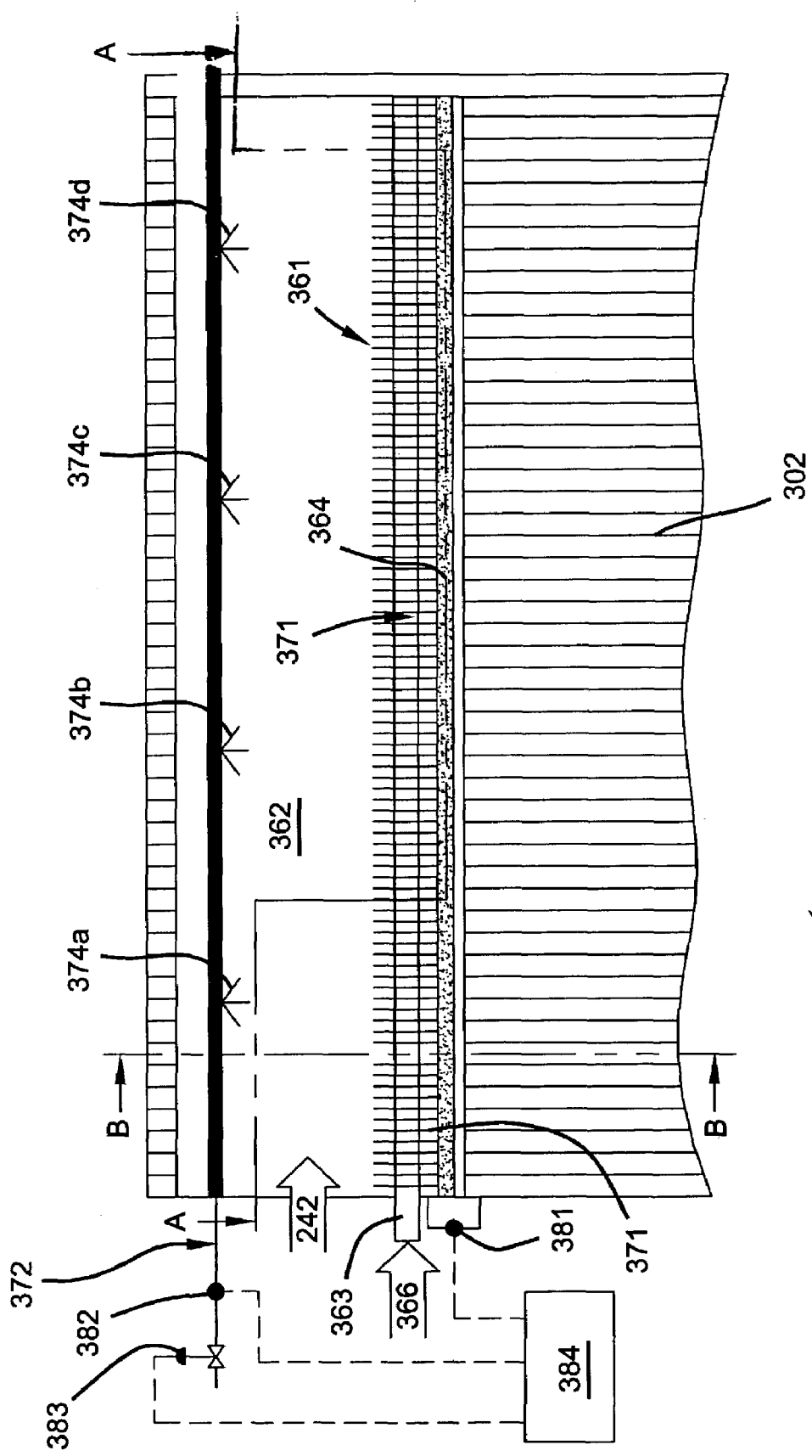
FIG. 3 is a side cross-sectional view showing detail in an integrated feed air humidifier, filter and cooler for a PEM fuel cell stack according to the present invention.
Figure 4:
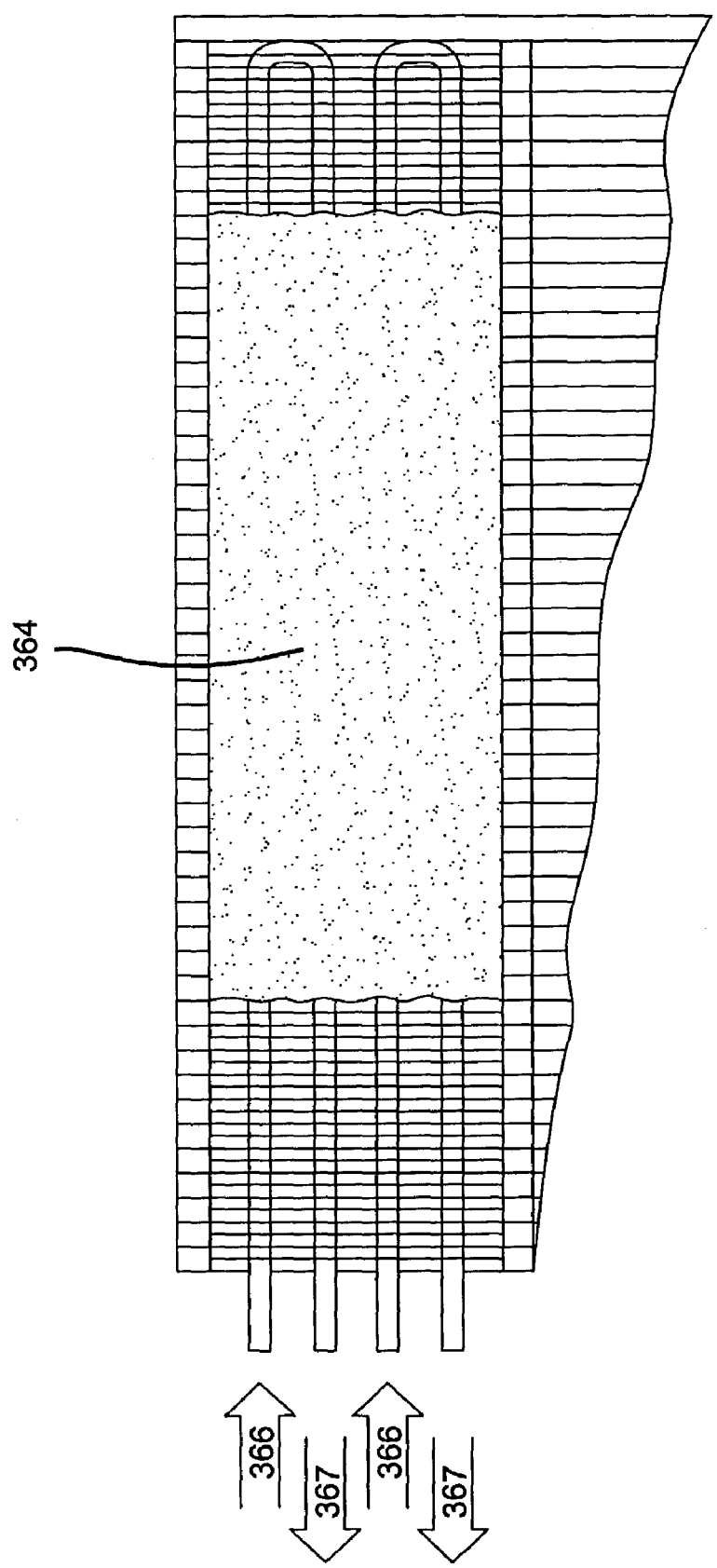
FIG. 4 is a top cross-sectional view of the fuel cell stack taken along line A—A in FIG. 3.
Figure 5:
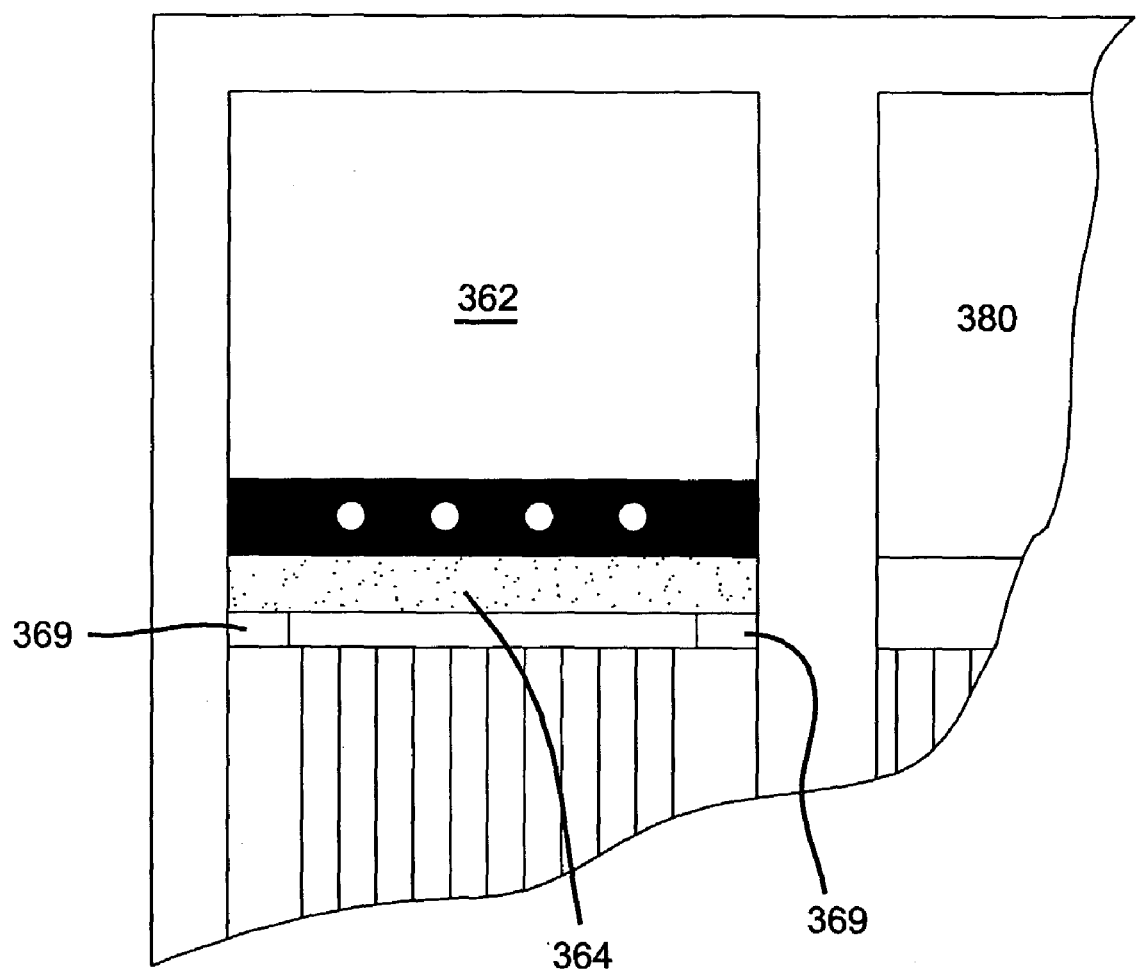
FIG. 5 is an end cross-sectional view of the fuel cell stack taken along line B—B in FIG. 3.

Turning now to FIGS. 3–5, a plurality of plates 302 similar to plates 212 are shown in FIG. 3 as generally defining the edges of flow channels for inputting feed gas stream to fuel cells in the fuel stack 300. Collectively, FIGS. 3–5 show detail in an integrated feed gas humidifier, filter, and cooler for a PEM fuel cell stack embodiment according to the present invention.

FIG. 3 also shows a heat exchanger 361 in the form of a tube and fin radiator element receiving input coolant flow 366 into pipe 363 and having attached individual heat exchange fins 371 which defines a fluid circuit providing cooling to the oxidant feed gas entering the fuel cell stack from manifold 362. FIG. 4 also shows that input coolant flow 366 occurs as a parallel flow with a serpentine leg discharging as coolant discharge flow 367. Coolant header 380 is shown in FIG. 5 as a source of coolant for supplying individual instances of flow 366 inter-cell coolant flow from coolant lines 250, 252 represented in plates 214, 216 of FIG. 2. Coolant flow 366 may be in place of or in addition to the inter-cell coolant flow. While the terms "cooling" and "coolant" has been used herein, a skilled practitioner will appreciate that the heat exchanger may also affect a temperature increase in the feed gas stream depending on the temperature difference between the coolant flow and the feed gas stream.

The evaporative element 364 is shown in FIGS. 3–5. Spray nozzles 374a, 374b, 374c, 374d provide a flow of water droplets (collectively as nebulized water) within the oxidant gas flow to establish a two-phase flow of nebulized water and air (oxygen) in manifold 362 to evaporative element 364. As presently preferred, evaporative element takes the form of a demisting packing which is sized and designed to provide a medium for passively promoting the evaporation the water in nebulized form into humidity for the oxidant gas stream.

A differential pressure transducer 381 is schematically shown to monitoring the pressure drop across the evaporative element for one fuel cell oxidant inlet. In practice a number of such transducer 381 may be used to define a representative profile of the pressure drop across the full expanse of evaporative element 364. A measurement signal from differential pressure transducer 381 is provided to control circuit 384. Flow transducer 382 is also optionally provided to control circuit 384 for indicating the water injected into the fuel cell stack 300. Control circuit 384 adjusts the flow of water stream 372 via positioning of control valve 383 in response to measurements from transducer 381, 382. In one embodiment, valve 383 operates in a similar manner to a fuel injection valve (as normally used in an internal combustion engine) with operational frequency and resultant intermittent spraying from spray nozzles 374a, 374b, 374c, 374d defined in real-time or near real-time by conditions as measured by transducer 381, 382. In another embodiment, control circuit 384 has input measurements from the temperature (not shown) of the oxidant gas as an input in the control decision logic executed by computer 384. Drainage lines (not shown) may be employed at the edges of filter 364 help in flooding control.

As presently preferred, evaporative element 364 is a filter capable of filtering particles larger in size than about 10 microns and, most preferably, of filtering particles larger in size than about 2 microns, and the water droplets of the nebulized water have a diameter between about 30–50 microns. Possible filter materials include conventional polyester fiber/mesh used for air filtration or other suitable moisture-resistant filter papers. Evaporative element 364 is a removable filter held in place by a frame with support rack 369 as best seen in FIG. 5 for receiving, holding, and releasing (upon withdrawal) the framed filter. This embodiment provides for a filter and evaporative element which is periodically replaceable in the fuel cell power system. Such replacement may be based on periodic scheduled maintenance or alternately when the pressure drop across the filter becomes unacceptably high.

Water is preferably added to the oxidant stream by nebulizing the water which is entrained in the air to the fuel cell. To this end, nozzles 374a, 374b, 374c, 374d are located in the water supply line 372 to nebulize the water, but remain a sufficient distance from evaporative element 364 at the oxidant inlet ends of the fuel cells to hydrate the area adjacent all fuel cells in the fuel cell stack.

In another aspect, water is nebulized in the manifold 362 in a plurality of water mass flow increments with respect to either position and/or time, so that pressure drop across evaporative element 364 from the nebulized water is sufficiently controlled to preserve the operation of the fuel cell power system. In this regard, spray nozzles 374 have a base throughput for nebulizing a flow of water into a spray; this base throughput corresponds to one of the nebulized water mass flow increments in the plurality of nebulized water mass flow increments. Control circuit 384 adjusts the nebulized water mass flow increments to maintain pressure drop control over evaporative element 364, either through analog control of the flow to nozzle 374 or through pulsed width modulation control (in a manner similar to fuel injection flow in an internal combustion engine and especially if the flow were to diminish below that needed by a spray nozzle to nebulize). In an alternative embodiment, nebulized water is provided through a system that does not depend upon throughput or flow rate (such as a sonic mister or thermal vaporizer) or is controlled by the water pump head pressure.

As used herein, "water" means water that, in compositional nature, is useful for operation of a fuel cell power system. While certain particulates are acceptable in the water, they will further accelerate plugging of evaporative element 364 in addition to the plugging caused by particulates in the oxidant gas. In a fuel cell, such plugging could be caused by trace mineral precipitates from the essentially entrained nebulized or particulate water. Preferably, sufficient pre-filtering of the air and water is suggested in extending the life of the evaporative element 364 between replacements.

A number of nozzle designs could be employed for providing the fine water spray, with an atomizer type nozzle being preferred in the fuel cell power system for providing a spray characterized by a volume mean diameter of between about 30 microns and about 50 microns and a flow rate of approximately 0.5 gallon per second at a pressure drop of approx. 10 bar and a temperature in the range of 5 to 60 degrees Celsius. However, a skilled practitioner will appreciate that the design and operating parameters of the nozzle are dependent on the system conditions such as power, temperature and pressure, and thus may vary for a given application.

In one alternative embodiment, each individual spray nozzle 374 is separately valved and controlled to provide a maximum number of controllable water mass flow increments, with each increment being the essentially predictable and constant flow where each spray nozzle will deliver its functionally suitable spray pattern at the pressure drop available. In another embodiment, a group of spray nozzles 374 are controlled at the water supply line 372. In yet another embodiment a group of spray nozzles may be mixed with other spray nozzles, which are individually controlled. It should be apparent from the above that a number of different arrangements of nozzles, supply lines and valving can achieve the provision of mass flow of nebulized water in a plurality of nebulized water mass flow increments.

In some cases also, spray nozzle 374 may be of different sizes to enable either pre-defined spray concentration profiles or to facilitate passage and flushing of particulates from within water pipe 372 to avoid clogging of any spray rack water nozzle 374. In this regard, the internal clearances on larger throughput nozzles would accommodate the passage of particulates more readily than the internal clearances on smaller throughput nozzles.

The present invention has been described above in conjunction with conditioning the cathode feed gas stream. In another embodiment, the present invention can be employed to condition the anode feed gas stream. In the context of designing for the flow and character of the fuel gas, the design of the fuel gas cooler, humidifier and filter is similar to that shown in FIGS. 3–5.

As should be apparent from a consideration of the foregoing, integration of filtration, mass transfer and heat transfer operations in the preferred embodiments are achieved both from utilization of filtration, mass transfer and heat transfer components to take advantage of structural support offered by the stack components and also from a unification of these elements and the functions preferred thereby into a common space within the fuel cell stack. This integration of evaporative cooler, filter, humidifier, heat exchanger and existing stack structure provides a basis for volume, weight, and cost reduction in a fuel cell power system.

The invention is described herein in a discussion of preferred embodiments, and a skilled practitioner will readily appreciate that various aspects of the preferred embodiment may be omitted or substituted from the embodiments described herein without departing from the spirit and scope of the invention. Accordingly, the invention should only be limited by the claims set forth below.

What is claimed is:

1. A fuel cell stack comprising:
   a housing;
   a stacked series of fuel cells located in the housing, each cell having an inlet end for receiving a reactant gas;
   a manifold located in the housing and communicating a feed stream from a source to each of the inlet ends of the fuel cell;
   a water spray mechanism located in the manifold and producing nebulized water in the feed stream; and
   a filter packing defining an evaporative element interposed between the manifold and the inlet ends of the fuel cell and receiving a portion of the nebulized water, the filter packing inhibiting the nebulized water from entering the inlet ends of the fuel cell and promoting evaporation of the received nebulized water into the feed stream as the feed stream passes through the filter packing and into the inlet ends of the fuel cell.

2. The fuel cell stack of claim 1 wherein the filter packing is a replaceable filter packing.

3. The fuel cell stack of claim 1 wherein the filter packing filters particles larger in size than about two microns.

4. The fuel cell stack of claim 1 wherein the nebulized water comprises water droplets having a diameter between about 30 microns and about 50 microns.

5. The fuel cell stack of claim 1 further comprising a pressure transducer operable for measuring a pressure differential across the evaporative element.

6. The fuel cell stack of claim 5 further comprising a control circuit for controlling a rate of flow of the nebulized water in response to a measurement signal from the pressure transducer.

7. The fuel cell stack of claim 1 further comprising a pressure transducer for measuring a pressure differential across the water spray mechanism.

8. The fuel cell stack of claim 7 further comprising a control circuit for controlling a rate of flow of the nebulized water in response to a measurement signal from the pressure transducer.

9. The fuel cell stack of claim 1 further comprising a heat exchange element located in the manifold to thermally condition the feed gas stream.

10. The fuel cell stack of claim 9 wherein the heat exchange element comprises a fluid circuit having a fluid circulating therethrough and the feed gas stream circulating over a portion of the fluid loop and in thermal conductivity therewith.

11. The fuel cell stack of claim 10 wherein the heat exchange element further comprises a tube and fin radiator having a pipe and a plurality of fins extending from the pipe.

12. The fuel cell stack of claim 9 wherein the filter element comprises a particulate filter.

13. The fuel cell stack of claim 9 wherein the filter packing is a replaceable filter packing.

14. The fuel cell stack of claim 9 wherein the filter packing filters particles larger than about two microns.

15. The fuel cell stack of claim 9 wherein the filter packing is interposed between the heat exchange element and the inlet ends of the fuel cell to filter the feed gas stream.

16. The fuel cell stack of claim 9 further comprising a water spray mechanism located in the manifold and producing nebulized water in the feed stream.

17. The fuel cell stack of claim 16 wherein the nebulized water comprises water droplets having a diameter between about 30 microns and about 50 microns.

18. The fuel cell stack of claim 16 wherein the filter packing is interposed between the water spray mechanism and the inlet ends of the fuel cell such that the nebulized water is evaporated into the feed stream.

19. A fuel cell stack comprising:
   a housing enclosing a stack of fuel cells, each fuel cell having a membrane electrode assembly including a cathode face in fluid interface with an oxidant gas flow field and an anode face and fluid interface with a fuel gas flow field;
   a filter packing defining an evaporative element disposed in said housing and conveying a reactant gas from a reactant gas source to one of said oxidant gas flow fields and said fuel gas flow fields; and
   a water spray mechanism disposed in said housing and providing a flow of water droplets to said evaporative element.

20. The fuel cell stack of claim 19 wherein said filter packing is provided in a frame, and said fuel cell stack further comprises a support rack releasably securing said frame so that said filter packing is selectively replaceable in said fuel cell stack.

21. The fuel cell stack of claim 19 wherein said filter packing filters particles larger in size than about 2 microns.

22. The fuel cell stack of claim 19 wherein said water spray mechanism includes at least one spray nozzle.

23. The fuel cell stack of claim 22 wherein said at least one spray nozzle provides a flow of water droplets having a diameter between about 30 microns and about 50 microns.

24. The fuel cell stack of claim 19 further comprising a differential pressure transducer for measuring a pressure drop across said evaporative element.

25. The fuel cell stack of claim 24 further comprising a valve to control a rate of flow of said water droplets in response to a measurement signal from said differential pressure transducer.

26. The fuel cell stack of claim 25 further comprising a control circuit to receive said measurement signal and to control said valve.

27. The fuel cell stack of claim 26 wherein said fuel cell plates are provided vertically with an inlet end of said oxidant gas flow fields terminating at an end of said stack, and wherein said evaporative element is positioned horizontally over said inlet ends adjacent said oxidant gas flow field.

28. The fuel cell stack of claim 27 further comprising a pressure transducer for measuring a pressure drop across the water spray mechanism.

29. The fuel cell stack of claim 28 further comprising a valve to control a rate of flow of said water droplets in response to a measurement signal from said pressure transducer.

30. The fuel cell stack of claim 29 further comprising a control circuit to receive said measurement signal and to control said valve.

31. The fuel cell stack of claim 30 further comprising a flow transducer for measuring said rate of flow of said water droplets and providing a control signal to said control circuit.

32. The fuel cell stack of claim 28 wherein said fuel cell plates are provided vertically with an inlet end of said fuel gas flow field terminating at an end of said stack, and wherein an additional evaporative element is positioned horizontally over said inlet ends adjacent said fuel gas flow field.

* * * * *